United States Patent [19]
Vocker et al.

[11] 3,759,171
[45] Sept. 18, 1973

[54] TRACTOR MOUNTED MATERIAL COMPACTOR

[76] Inventors: Harold R. Vocker, 109 Kentucky St., Monroe, La. 71201; David L. Marcovitz, 2022 Valencia St., Monroe, La.; I. L. Thompson, Rt. 4, Box 192; Woodrow Wallace, Rt. 4, Box 404, both of Holly Ridge, La.

[22] Filed: Mar. 9, 1972
[21] Appl. No.: 233,569

[52] U.S. Cl. ............................................. 100/100
[51] Int. Cl. ............................................. B30b 15/00
[58] Field of Search .............. 100/100, 233; 94/48, 94/49; 212/55

[56] References Cited
UNITED STATES PATENTS
3,691,967  9/1972  Mett et al. ........................ 100/100
3,376,799  4/1968  Perry et al. ............................. 94/49
3,543,945  12/1970  Nelson ............................... 212/55 X Primary Examiner—Harvey C. Hornsby
Assistant Examiner—Philip R. Coe
Attorney—Revere B. Gurley

[57] ABSTRACT

An apparatus for compacting loose material in an open container, such as a trailer, consists of a frame attached to a tractor with a boom and packer foot which can be extended over an open trailer and moved up and down to compact material, such as raw cottom, in the trailer. The boom may be operated from the hydraulic system of the tractor.

4 Claims, 2 Drawing Figures

TRACTOR MOUNTED MATERIAL COMPACTOR

This invention resides in an apparatus for packing loose material in an open container and is especially useful for the cotton farmer to use to pack loose raw cotton in an open trailer.

The loose raw cotton is carried to the gin in trailers and must be compacted as tightly as feasible to save space and number of trailer loads. Until this invention, the usual practice has been to employ men to tramp the cotton in the trailer. The use of this apparatus to compact the cotton saves the work of several men and packs the cotton more tightly.

The subject of this invention is an apparatus which is readily attached to and carried on a tractor, may be used to compact loose material, such as raw cotton in a trailer body, and is operated by a power source on a conventional tractor.

The apparatus consists of a frame which may be quickly bolted to the frame of a tractor, a boom extending from the frame and a post having a tamping foot depending from the outer end of the beam, so that the boom may extend over the trailer and the foot press downwardly on the material in the trailer. Hydraulic cylinders operate the post to move it to different positions in the trailer and the boom to move the foot to compact the material. The tractor may also move the apparatus along the trailer and also from one trailer to another.

DRAWINGS

GENERAL DESCRIPTION

Figure 1:
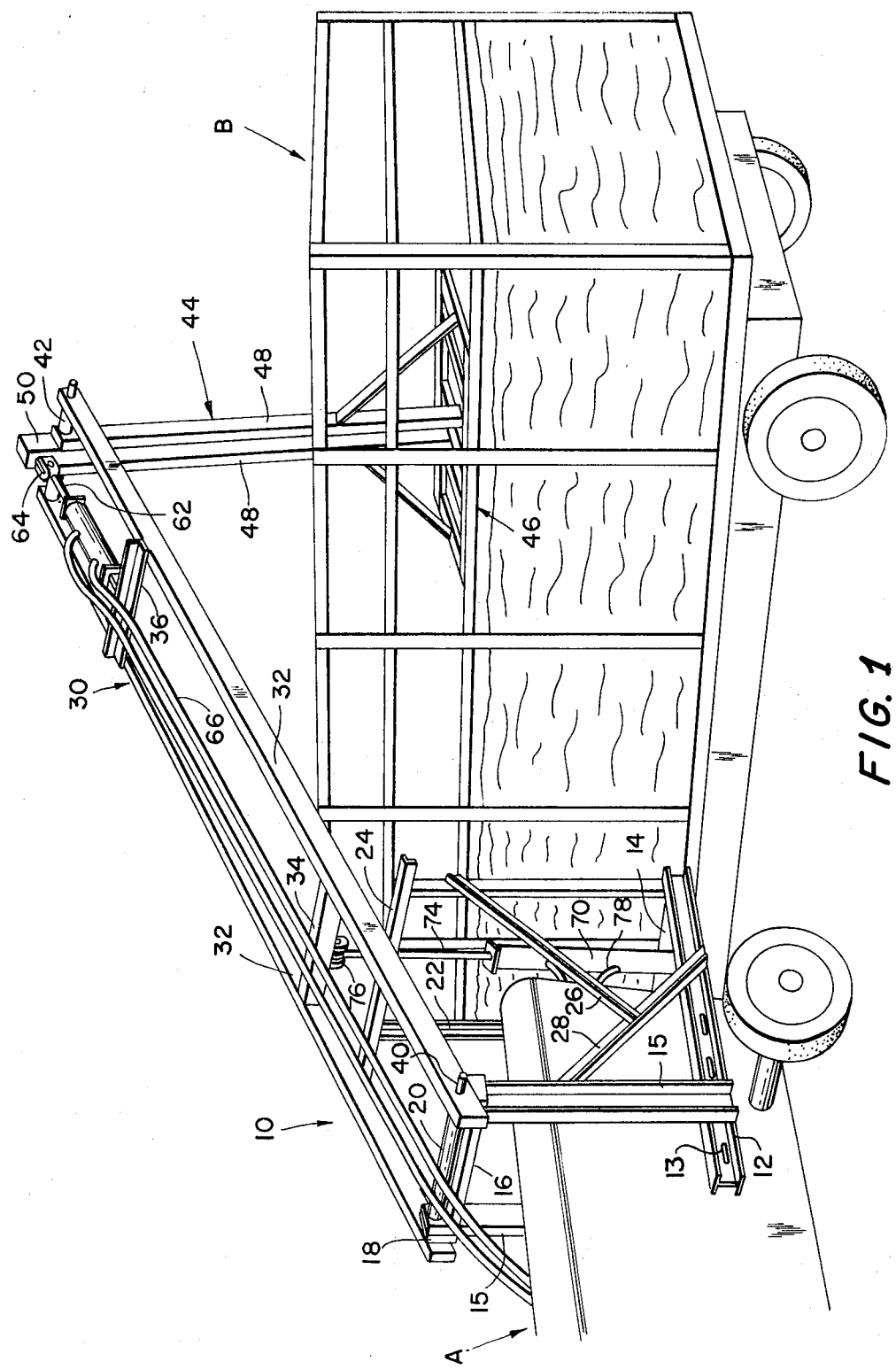
FIG. 1 shows a perspective view of the compacting apparatus mounted on the frame of a tractor, with the packer foot in a trailer body.
Figure 2:
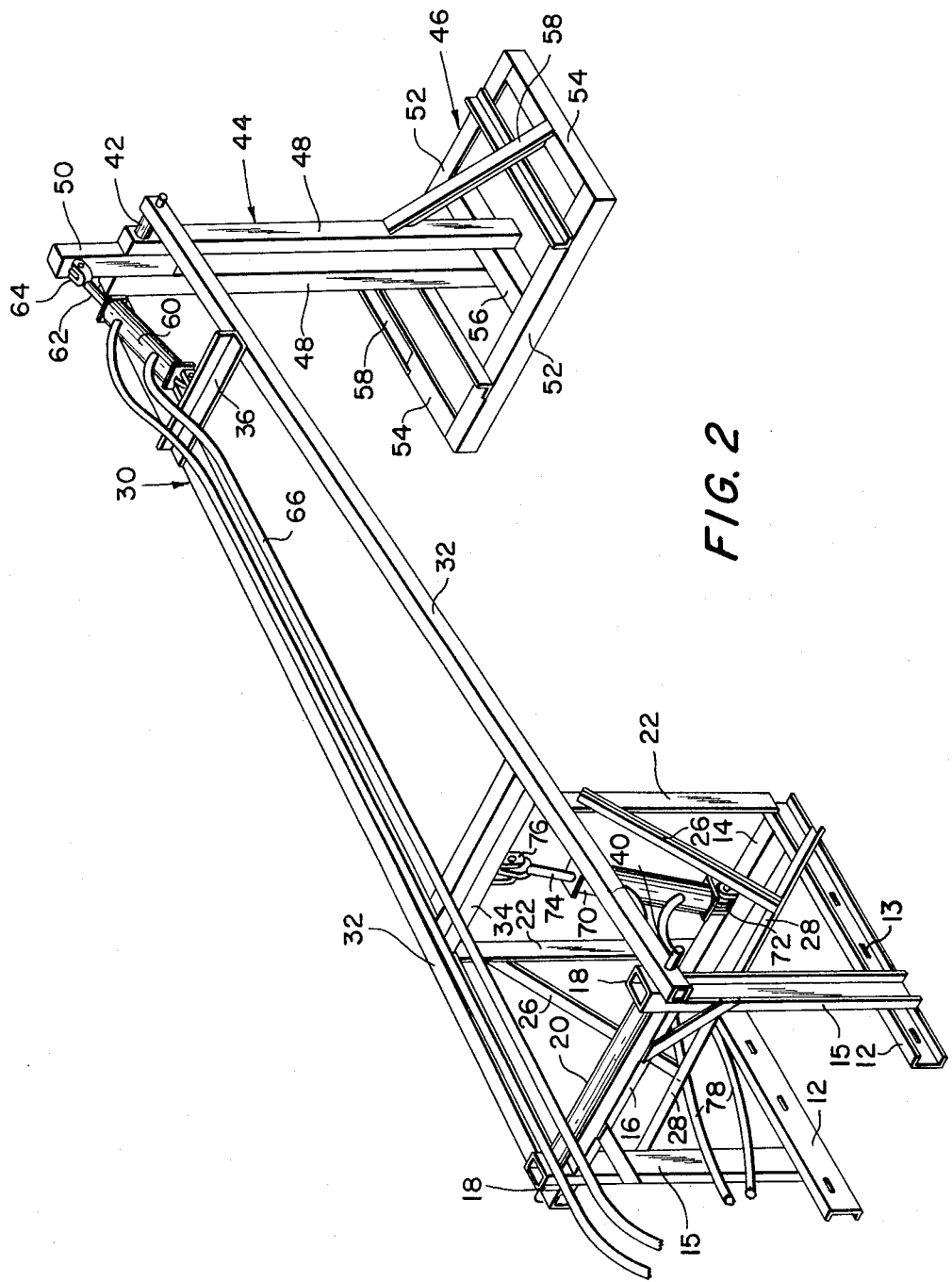
FIG. 2 shows a perspective view of the compacting apparatus, illustrating the details of construction.

The apparatus 10 of this invention is mounted on the tractor A of conventional construction and is shown with its packer foot in the trailer B to compact the loose material therein. The two side rails 12 are bolted to the frame of the tractor at 13 and extend forwardly of the tractor, and are connected at their forward ends by a fixed cross bar 14.

Two vertical posts 15 are fixed to the rear ends of rails 12 and connected by a cross bar 16. The upper ends of these posts 15 have blocks 18 fixed on their outer sides and a tube 20 extends through the posts and blocks.

At the forward ends of rails 12, two posts 22, substantially higher than posts 15, are secured and are connected at their upper ends by a bar 24 and braced to the rails 12 by braces 26 and 28.

The boom 30 is formed by two side beams 32 connected together by cross bars 34, 36. This boom is pivoted to the rear posts 15 by a rod 40 extending through the rear ends of the beams 32 of boom 30 and through the tube 20 and ends of posts 15. At the front end of boom 30 a rod 42 between the ends of beams 32 forms an axis for the packer arm 44 pivoted thereon, which carries a packer foot 46 fixed to its lower end.

The packer arm 44 is formed of two spaced posts 48 with an intermediate block 50 between them, through which rod 42 extends. The packer foot 46 is formed as a rectangular frame having side members 52 and end members 54, with a central cross member 56 between said side members. The posts 48 are fixed to the cross member 56 and further braced by braces 58 between the posts 48 and end members 54 of the packer foot 46.

The packer arm 44 may be pivoted about the rod 42 by a hydraulic cylinder 60 connected to cross bar 36 of the boom 30 and having a piston rod 62 connected at 64 to the upper end of the block 50 above the rod 42. Hydraulic lines 66 convey fluid from the hydraulic system of the tractor A under control of valves on the tractor to move the packer arm 44 and foot 46 about the rod 42 and move the packer foot 46 to different positions.

A second hydraulic cylinder 70 is connected at 72 to the cross bar 14 on the forward end of the frame. A piston rod 74 is connected to rear cross bar 34 of boom 30 at 76. Hydraulic lines 78 connect to the hydraulic system of the tractor and fluid under control of control valves on the tractor actuates the piston to move boom 30 up and down to compact material in trailer B.

The compacting apparatus is mounted on a tractor by bolting the side rails 12 to the frame of a tractor with the frame extending forwardly of the tractor. The boom 30 is raised by actuation of hydraulic cylinder 70 and the tractor moves the packer foot over the trailer B. The boom 30 and foot 46 are then lowered and the foot compacts material in the trailer under force of hydraulic fluid in cylinder 70. As the boom is raised and lowered to compact the material, as cotton, in the trailer, the foot may be moved back and forth by actuation of the packer arm cylinder 60. The tractor may also be moved to move the boom and foot to different positions.

We claim:

1. An apparatus mounted on a tractor for compacting loose material in an open container spaced from said tractor comprising a frame having side members for attachment to the side frame members of a tractor, said frame extending upwardly from said side members above the engine hood of said tractor, a substantially rigid boom pivoted at its rear end to the frame above the engine hood and extending upwardly and outwardly beyond said tractor, a first power actuator on said frame and connected to said boom for raising and lowering said boom, means connecting said power actuator to a power source on said tractor to actuate said boom, a substantially rigid arm pivoted at its upper end to the forward end of said boom and extending downwardly and having a packer foot connected directly to its lower end, and means connected to said arm to move said arm and foot about its pivot, so that said boom may be raised and lowered by said power actuator to compact loose material by said packing foot in said open container, and said packing foot may be moved over said material by moving said tractor or by moving said arm about its pivot on said boom.

2. In an apparatus as claimed in claim 1, in which the power actuator for raising and lowering said boom is connected to the hydraulic system of said tractor and is operated by hydraulic fluid from said system.

3. In an apparatus as claimed in claim 1, in which the apparatus mounted on the tractor may be moved by said tractor to position said packer foot to different positions, and the boom may be raised and the tractor moved to move the packer foot from and to different trailers, and said means to move said arm about its pivot on the boom is connected to the power source on the tractor.

4. An apparatus mounted on a tractor for compacting loose material in an open vehicle body, comprising a frame member having side members for attachment to the forward ends of the side frame members of a tractor, said frame member having vertical supporting members extending upwardly from said side members above the engine hood of said tractor, a substantially rigid boom pivoted at its rear end to said vertical supporting members above said hood and extending upwardly and outwardly beyond said tractor, a first hydraulic cylinder and piston connected at one end to said frame and at the other end to an intermediate point on said boom, hydraulic lines for connection to the hydraulic system of said tractor and supplying hydraulic pressure to actuate said piston and cylinder and raise and lower said boom, a substantially rigid arm pivoted at its upper end on the forward end of said boom and extending downwardly and a packing foot connected directly to the lower end of said arm, a second cylinder and piston connected to said boom and said arm for moving said foot toward or away from said frame, and hydraulic lines connected to the hydraulic system of said tractor and to said second cylinder and piston and supplying hydraulic pressure to move said arm on said boom, said boom being raised to move said foot above a vehicle body and lowered to pack loose material in said body, and said arm moving said foot toward or away from said frame, while the tractor may move said foot along said body to pack the material at all points in said body.

* * * * *